(12) United States Patent
Flordal et al.

(10) Patent No.: US 10,001,941 B2
(45) Date of Patent: Jun. 19, 2018

(54) GRAPHICS PROCESSING SYSTEMS

(71) Applicant: ARM Limited, Cambridge (GB)

(72) Inventors: Lars Oskar Flordal, Uppsala (SE);
Toni Viki Brkic, Staffanstorp (SE);
Jakob Axel Fries, Malmö (SE)

(73) Assignee: Arm Limited, Cambridge (GB)

( * ) Notice: Subject to any disclaimer, the term of this patent is extended or adjusted under 35 U.S.C. 154(b) by 0 days. days.

(21) Appl. No.: 15/469,503

(22) Filed: Mar. 25, 2017

(65) Prior Publication Data
US 2017/0287101 A1 Oct. 5, 2017

(30) Foreign Application Priority Data

Mar. 30, 2016 (GB) .................................. 1605348.0

(51) Int. Cl.
*G09G 5/393* (2006.01)
*G06T 11/40* (2006.01)
(Continued)

(52) U.S. Cl.
CPC ............ *G06F 3/064* (2013.01); *G06F 3/0604* (2013.01); *G06F 3/0673* (2013.01); *G06T 1/20* (2013.01); *G06T 1/60* (2013.01); *G06T 11/40* (2013.01); *G09G 5/393* (2013.01); *G06T 2210/08* (2013.01); *G09G 2360/12* (2013.01); *G09G 2360/122* (2013.01)

(58) Field of Classification Search
None
See application file for complete search history.

(56) References Cited

U.S. PATENT DOCUMENTS

| | | |
|---|---|---|
| 8,542,939 B2 | 9/2013 | Nystad |
| 8,990,518 B2 | 3/2015 | Nystad |
| | (Continued) | |

FOREIGN PATENT DOCUMENTS

| | | |
|---|---|---|
| GB | 2515882 | 1/2015 |
| GB | 2519422 | 4/2015 |

OTHER PUBLICATIONS

Combined Search and Examination Report dated Oct. 3, 2016, GB Patent Application GB1605348.0.
U.S. Appl. No. 15/472,637, filed Oct. 5, 2017.

*Primary Examiner* — Joni Richer
(74) *Attorney, Agent, or Firm* — Vierra Magen Marcus LLP

(57) ABSTRACT

A tile-based graphics processing pipeline includes rendering circuitry for rendering graphics fragments to generate rendered fragment data. Each graphics fragment has associated with it a set of sampling positions to be rendered. The pipeline also includes a tile buffer configured to store rendered fragment data for sampling positions prior to the rendered fragment data being written out to memory, write out circuitry configured to write a compressed representation of the rendered fragment data for a tile in the tile buffer to memory, and processing circuitry. The processing circuitry identifies, based on the writing of rendered fragment data to the tile buffer, any blocks comprising sampling positions within a tile having the same data value associated with each sampling position in the block, and to, when such a block of sampling positions is identified, trigger the write out circuitry to write a compressed representation of the block to the memory.

13 Claims, 3 Drawing Sheets

(51) Int. Cl.
    *G06F 3/06*     (2006.01)
    *G06T 1/20*     (2006.01)
    *G06T 1/60*     (2006.01)

(56) References Cited

U.S. PATENT DOCUMENTS

| | | |
|---|---|---|
| 9,014,496 B2 | 4/2015 | Nystad |
| 9,116,790 B2 | 8/2015 | Nystad |
| 2003/0142523 A1* | 7/2003 | Biacs ............... G01C 21/005 365/1 |
| 2004/0135781 A1* | 7/2004 | Shao ................ G06T 15/405 345/422 |
| 2008/0273029 A1* | 11/2008 | Brennan ........... G06T 15/405 345/420 |
| 2014/0192075 A1* | 7/2014 | Stamoulis ........ G09G 5/393 345/549 |
| 2014/0368521 A1 | 12/2014 | Lassen et al. |
| 2015/0109293 A1* | 4/2015 | Wang ................ G06T 15/405 345/422 |
| 2017/0285955 A1 | 10/2017 | Carter et al. |

\* cited by examiner

GRAPHICS PROCESSING SYSTEMS

BACKGROUND

This technology described herein relates to graphics processing systems, and in particular to tile-based graphics processing systems.

Graphics processing systems may use so-called "tile-based" rendering. In tile based rendering, the, e.g., two dimensional, output array or frame of the rendering process (the "render target") (e.g., and typically, that will be displayed to display a scene that is being rendered) is subdivided or partitioned into a plurality of smaller sub-regions, usually referred to as "tiles", for the rendering process. The tiles (sub-regions) are each rendered separately (typically one after another). The rendered tiles (sub-regions) are then recombined to provide the complete output array (frame) (render target), e.g. for display.

The tiles can therefore be thought of as the sub divisions of the render target area (output frame) that the rendering process operates on. In such arrangements, the render target area (output frame) is typically divided into regularly sized and shaped tiles (they are usually, e.g., squares or rectangles) but this is not essential.

Each tile will comprise a block (array) of sampling positions and may be any suitable and desired size, but is typically a block of 16×16 sampling positions or 32×8 sampling positions. (Each sampling position in the tile, e.g. for which rendered fragment data is generated, may be the same size and location as a "pixel" of the output (e.g. output frame) (since as the pixels are the singularities in the final display, there may be a one-to-one mapping between the sampling positions the rendering circuitry renders and the pixels of a display). However, it can be the case that there is not a one-to-one correspondence between a sampling position and a display pixel, for example where particular forms of post-processing, such as downsampling, are carried out on the rendered image prior to displaying the final image.)

Other terms that are commonly used for "tiling" and "tile-based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

In tile-based graphics processing, sampling positions for a tile are rendered to derive a set of rendered graphics data, such as red, green and blue (RGB) colour values and an "alpha" (transparency) value (or corresponding values in other colour spaces, e.g. YUV components, or other data values that may be generated for sampling positions using a graphics processing pipeline), necessary to represent each sampling position, e.g. for display.

Graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data.

A tile-based graphics processing pipeline will also include one or more so-called tile buffers that store rendered sampling position data at the end of the pipeline until a given tile is completed and written out to an external memory, such as a frame buffer, for use, e.g. in displaying the output frame. This local, pipeline memory is used to retain rendered sampling position data locally before the data is finally exported to external memory.

In order to facilitate the writing back of rendered graphics data from the tile buffers to external memory, such as a frame buffer, a graphics processing pipeline will typically include write out circuitry coupled to the tile buffer pipeline memory for this purpose.

One issue that arises in the context of graphics processors, particularly for graphics processors that are to be used in lower power and portable devices, is the bandwidth cost of writing data to external memory from the graphics processing pipeline. Bandwidth consumption can be a big source of heat and of power consumption, and so it is generally desirable to try to reduce bandwidth consumption for external memory writes in graphics processing systems.

In order to try to reduce the bandwidth consumption for external memory writes in graphics processing systems, frame buffer compression techniques may be used to try to reduce the amount of data that is required to be written to the frame buffer. Such compression techniques may, inter alia, attempt to identify, when reading the fragment data in the tile buffer for writing to the frame buffer, blocks of sampling positions, e.g. the whole tile, for which the colour is constant across the block.

One such frame buffer compression technique is described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

Identifying such blocks of constant colour may enable the colour data for the block of sampling positions to be more efficiently compressed for storing in the frame buffer, e.g. by writing out to the frame buffer only a single colour value for the block of sampling positions having the same colour rather than storing a separate colour value for each sampling position in the block. This may allow the amount of information that needs to be written out to the frame buffer and stored for the tile (and thus processed when displaying the tile) to be reduced.

Notwithstanding these known techniques, the Applicants believe that there remains scope for further improvements for reducing bandwidth consumption by graphics processing pipelines, and in particular by tile-based graphics processors when performing real-time graphics processing operations.

BRIEF DESCRIPTION OF THE DRAWINGS

An embodiment of the technology described herein will now be described by way of example only and with reference to the accompanying drawings, in which.

DETAILED DESCRIPTION

Figure 1:
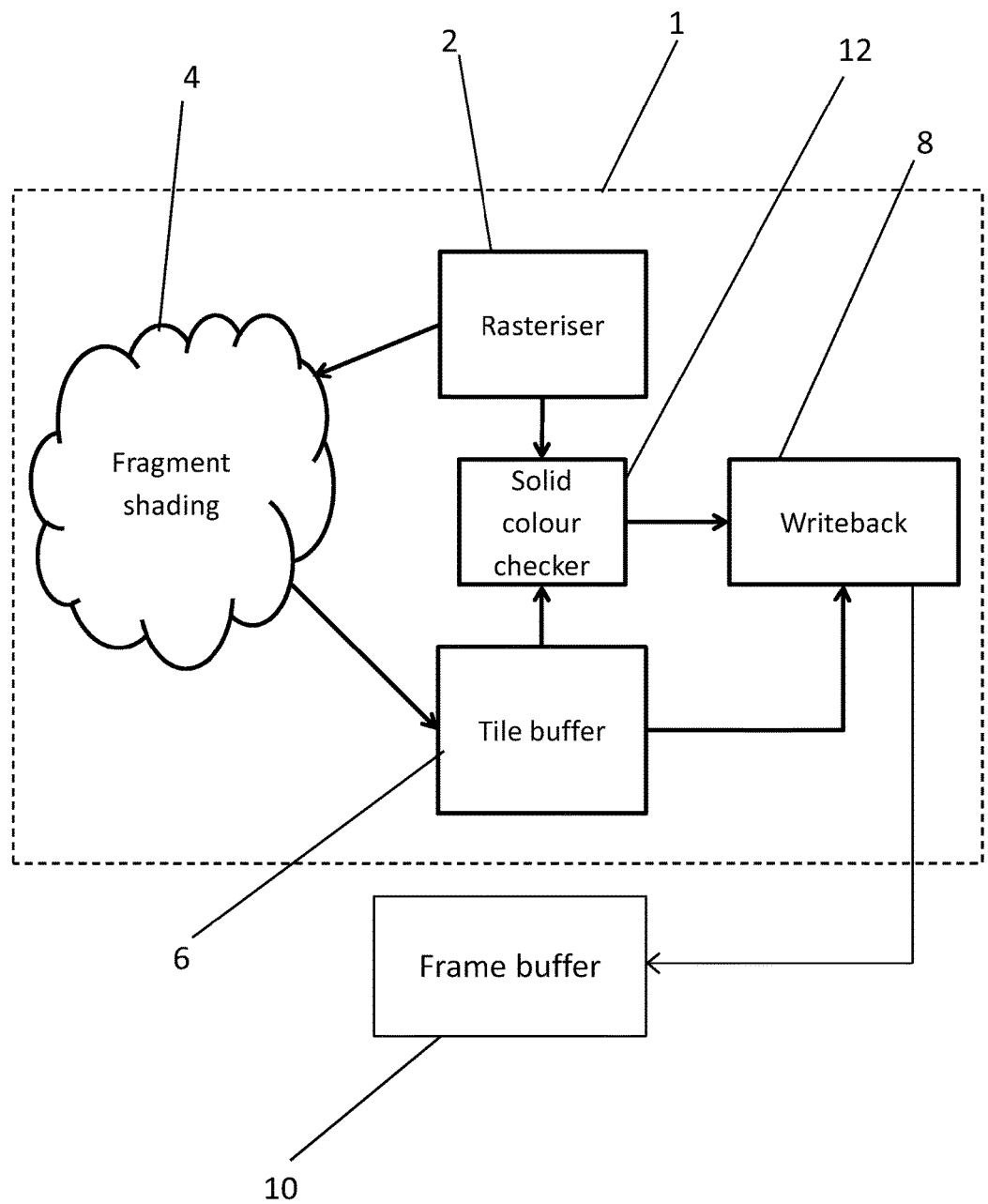
FIG. 1 shows a schematic of a tile-based graphics processing pipeline in accordance with an embodiment of the technology described herein.

One embodiment of the technology described herein comprises a method of operating a tile-based graphics processing pipeline that comprises:

a tile buffer configured to store rendered fragment data for sampling positions locally to the graphics processing pipeline prior to the rendered fragment data being written out to memory;

the method comprising:
rendering graphics fragments to generate rendered fragment data, each graphics fragment having associated with it a set of one or more sampling positions to be rendered in a tile;
writing the rendered fragment data for sampling positions in the tile to the tile buffer;
identifying, based on the writing of rendered fragment data to the tile buffer for a tile, a block comprising a plurality of sampling positions within the tile having the same data value associated with each of the plurality of sampling positions in the block; and
when a block of sampling positions within a tile each having the same data value associated with them is identified, writing a compressed representation of the block of same data value sampling positions to the memory.

Another embodiment of the technology described herein comprises a tile-based graphics processing pipeline comprising:
rendering circuitry for rendering graphics fragments to generate rendered fragment data, each graphics fragment having associated with it a set of one or more sampling positions to be rendered;
a tile buffer configured to store rendered fragment data for sampling positions locally to the graphics processing pipeline prior to the rendered fragment data being written out to memory;
write out circuitry configured to write a compressed representation of the rendered fragment data for a tile in the tile buffer to memory; and
processing circuitry operable to:
identify, based on the writing of rendered fragment data to the tile buffer for a tile, a block comprising a plurality of sampling positions within the tile having the same data value associated with each of the plurality of sampling positions in the block; and
trigger the write out circuitry, when a block of sampling positions within a tile each having the same data value associated with them is identified, to write a compressed representation of the block of same data value sampling positions to the memory.

The technology described herein comprises a tile-based graphics processing pipeline and a method of processing graphics data in such a pipeline. The pipeline includes rendering circuitry for rendering graphics fragments to generate rendered fragment data for sampling positions (e.g. a tile at a time). The pipeline also includes a tile buffer, which stores the rendered fragment data, that is local to the processing pipeline, prior to the rendered fragment data being written out to, e.g. external, memory. The pipeline further includes write out circuitry for writing a compressed representation of the rendered fragment data for a tile in the tile buffer to memory.

The rendered fragment data, rendered by the rendering circuitry for graphics fragments that have been generated for a tile, is written, e.g. by the rendering circuitry, to the tile buffer for the sampling positions that are associated with the fragments.

The graphics processing pipeline of the technology described herein further includes processing circuitry that identifies, based on the rendered fragment data (or, e.g., the absence thereof) that is written to the tile buffer, a block (or, e.g., blocks) of multiple sampling positions in the tile that all have the same data value, e.g. colour, associated with each of the sampling positions in the block.

When such a block is identified (containing sampling positions having associated with them a same data value for all the sampling positions in the block), the processing circuitry triggers the write out circuitry to write a compressed representation of the block of sampling positions having a same data value to the, e.g. external, memory.

By identifying blocks of sampling positions having the same, constant data value for all of the sampling positions in the block, based on the writing of rendered fragment data to the tile buffer for sampling positions in a tile, it is possible to identify and write out a compressed version of such a block of sampling positions, such as only a single data value for the block as a whole, to the memory, without having to read all the rendered fragment data that is stored in the tile buffer for the entire tile.

This therefore may help to reduce the amount of data that has to be processed, and the memory bandwidth required, to compress the rendered fragment data in the tile buffer. For example, it will be appreciated that when a block having a constant data value for all the sampling positions in the block has already been identified when writing the rendered fragment data for the sampling positions to the tile buffer, there is no need to further analyse the data values, e.g. associated with the sampling positions in the tile, stored in the tile buffer to look for redundancy in the data values.

The rendering circuitry is arranged to process, for each tile, e.g. in a frame to be displayed, any fragments that have been generated for the tile (and which are associated with sampling positions in the array of sampling positions for the tile) to generate rendered fragment data for each fragment. In one embodiment the rendered fragment data includes a (RGB) colour value, along with a transparency ("alpha") value for each fragment (e.g. as a set of RGBa values). (If a sampling position in the array of sampling positions does not have a fragment generated (and thus processed) for it, this indicates that there is nothing to be displayed for this sampling position for the tile and thus it is "clear", e.g. a default colour may be used, e.g. for display.)

The data value for which the processing circuitry identifies blocks of same data values may be any suitable and desired data value, e.g. of a variable associated with the sampling positions in the block (and therefore in the tile).

In one embodiment the block has only one data value that is the same for each of the sampling positions in the block. For example, one of the colour (RGB) channels (or transparency (alpha) value) may have the same data value for each of the sampling positions in the block. In another embodiment there are a plurality of data values (e.g. for different variables, e.g. in the rendered fragment data) associated with each of the sampling positions in the block, wherein the set of plural data values that are associated with each sampling positions are the same for each of the sampling positions in the block. Thus, for example, the set of RGB (or RGBa) values may be the same for each sampling position in the block, e.g. the block has a constant overall colour (and, e.g., transparency).

As alluded to above, in an embodiment the data value (for which the block of sampling positions is identified as having a constant value) is a colour value (or set of, e.g. RGB, colour values) of the sampling positions in the block.

The blocks that are identified as having constant data values for each of the sampling positions in the block may be any suitable and desired shape and/or size. In an embodiment, the blocks comprise a rectangular (including square) block of (e.g. contiguous) sampling positions.

In one embodiment the blocks comprise the whole tile, i.e. it is identified whether all the sampling positions of a tile have the same data value associated with them (or not).

In another embodiment, the blocks of sampling positions that are considered (that may be identified) may, and in an embodiment do, comprise a, e.g. rectangular, group of sampling positions that is smaller than the whole tile, e.g. 8×8 or 4×4 sampling positions.

In one embodiment the processing circuitry is configured to (and able to) identify a block of constant data value sampling positions in the tile for a plurality of differently sized blocks, e.g. both for the whole tile and for blocks that are smaller than the tile.

Blocks of constant data value sampling positions may be identified, based on the writing of rendered fragment data to the tile buffer for a tile, in any suitable and desired way. The Applicant has appreciated that a number of different ways to identify constant data value blocks of sampling positions may be used, as will now be described.

In one embodiment the processing circuitry identifies constant data value blocks of sampling positions based on whether the sampling positions in the tile buffer are written to or not when the tile is rendered. In one embodiment a constant data value block of sampling positions is identified based on the absence of writing (rendered fragment data) to the sampling positions in the tile buffer for the block when the tile is rendered (with such a "clear" block of sampling positions then being identified as and treated as a constant data value block of sampling positions).

In such a "clear" block none of the sampling positions in the block (e.g. tile) are rendered and thus nothing (e.g. no rendered fragment data for any sampling positions in the block) is written to the tile buffer for the block (e.g. tile) of sampling positions when rendering the tile. Thus in one embodiment the processing circuitry is operable to identify, based on the absence of the writing of rendered fragment data to the tile buffer for a tile, a block comprising a plurality of sampling positions within the tile to which no rendered fragment data will be or has been written in the tile buffer when rendering the tile.

(No rendered fragment data may be written to sampling positions in the tile buffer for a tile, e.g. because no fragments were rasterised and processed by the rendering circuitry for those sampling positions for the tile.)

It will be appreciated that in these arrangements where a block of sampling positions that has not been written to when rendering the tile is identified as a constant, same data value block, then the same (constant) data value that is associated with each of the plurality of sampling positions in the block will not be a data value that was written to the block of sampling positions when rendering the tile, but rather will, in effect, be a data value (such as a "clear" value) that is to be used when no rendered fragment data is actually written to a sampling position when rendering a tile. Thus, in these cases the constant data value for the block of sampling positions will, e.g., be a default or "clear" data value that is to be used when there is no rendered fragment data for a sampling position (such as a default, e.g. background, data value (e.g. colour) that should be used for a sampling position in that event). The default or "clear" data value to be used when there is no rendered fragment data for a sampling position may, for example, be indicated by a separate render output (e.g. frame) descriptor that is, e.g., read once per render output (frame).

The determination that no rendered fragment data will be or has been written to sampling positions in the tile buffer when rendering the tile may be determined at any suitable and desired stage of the processing pipeline.

In one embodiment a block of sampling positions to which no rendered fragment data will be written to the tile buffer when rendering the tile (i.e. a "clear" block) is identified at the rasterising stage (i.e. when input primitives are rasterised to generate graphics fragments to be processed), e.g., and in an embodiment, by identifying block(s) comprising a plurality of sampling positions within a tile for which no fragments have been generated by the rasterising stage (process) (i.e. for which there are no primitives at least partially covering the sampling positions). (It will be appreciated that no rendered fragment data will be written to the tile buffer for any sampling positions having no generated fragments.)

In another embodiment a block of "clear" (unwritten) sampling positions is identified at the tile buffer writing stage (based on the operation of writing rendered fragment data for the tile to the tile buffer (as data is being written to the tile buffer (or not)). In one embodiment this is based on (the absence of) write transactions at the write port of the tile buffer.

The identification of a "clear" block of sampling positions from the writing of the rendered fragment data for the tile to the tile buffer may be performed in any suitable and desired manner. In an embodiment the processing circuitry is operable to track the writing (and thus, e.g., also the absence of writing) of rendered fragment data to the sampling positions in the tile buffer for a tile as that data is written to the tile buffer (as the tile is rendered), and to identify, based on the tracking of the writing of rendered fragment data to the tile buffer, block(s) comprising a plurality of sampling positions within a tile to which no rendered fragment data is written in the tile buffer when rendering the tile.

The writing or not of rendered fragment data to the sampling positions of a tile may be tracked in any suitable and desired way. In an embodiment a ("clear bits") bitmap is used to track the writing of rendered fragment data to the tile buffer, as that data is written to the tile buffer.

In one embodiment the bitmap comprises a bit for each sampling position (or set of sampling positions) in the tile for indicating whether the sampling position has had (or has not had) rendered fragment data written to it in the tile buffer as a result of the rendering process. In one embodiment the bitmap is updated when rendered fragment data generated for a sampling position is written to the sampling position in the tile buffer. Thus in one embodiment the bitmap is initially set to "clear" and then updated when(ever) rendered fragment data is generated and written to the tile buffer for a sampling position in the tile. In one embodiment the bitmap is stored in storage local to the pipeline but separate from the tile buffer, and that allows all of the "clear" bits to be read at once, e.g. in a register(s) and/or flip-flops.

In this arrangement, once (e.g. all the) rendered fragment data for the array of sampling positions in the tile has been written to the tile buffer (and thus the bitmap indicates, for each sampling position, whether rendered fragment data has been written to the tile buffer for the sampling position or not), in one embodiment the processing circuitry operates to identify, using the bitmap, any blocks comprising a plurality of sampling positions within the tile that are have not been written to when rendering the tile (i.e. that are each "clear"). In one embodiment the "clear bits" bitmap is thus used to identify blocks of sampling positions that have not been written to when rendering the tile (i.e. that are clear) within a tile (which may be the whole tile when no rendered fragment data is written to it the tile buffer for the tile at all, or may be some portion of the tile for which no data is written).

In an embodiment, constant data value blocks of sampling positions can be and are also or instead (and, in an embodiment, also) identified for blocks of sampling positions for which data is written to the tile buffer as a tile is rendered (i.e. for blocks of sampling positions for which rendered fragment data is present in the tile buffer). In this case, a constant data value block will be identified in the case that the same data value(s) is written to the sampling positions of the whole block as the tile is rendered.

Thus in one embodiment the processing circuitry is operable to identify, based on the writing of rendered fragment data to the tile buffer for a tile, a block (e.g. tile) of sampling positions that has the same data value or set of values (e.g. for one or more of the, e.g. RGB, colour channels) written to it as rendered fragment data associated with each of the plurality of sampling positions in the block.

A block of sampling positions that has had the same rendered fragment data value(s) written to it may be identified at any suitable and desired stage of the graphics processing pipeline.

In one embodiment constant data (e.g. colour) value(s) blocks of sampling positions are identified by tracking the rendered fragment data that is written to the tile buffer as that data is written to (is being written to) the tile buffer, in one embodiment based on write transactions at the write port of the tile buffer.

Thus in one embodiment the processing circuitry is operable to track the writing of a or plural particular rendered fragment data value(s) (or set(s) of data values) to the sampling positions in the tile buffer for a tile as that data is written to the tile buffer (e.g., and in an embodiment, based on the data values and write transactions appearing at the tile buffer's write port), and to identify, based on the tracking of the particular data value(s) (or set(s) of data values) in the rendered fragment data being written to the tile buffer, a block comprising a plurality of sampling positions within a tile that has associated with each of the sampling positions of the block rendered fragment data comprising the same (particular) data value (or set of data values).

A block of plural sampling positions having the same data (e.g. colour) value (or set of data (e.g. colour) values) associated with them in the rendered fragment data may be determined from tracking the data value(s) as the rendered fragment data is written to the sampling positions in the tile buffer for a tile in any suitable and desired way.

In one embodiment, each data value (or set of data values) that is written to a sampling position in the tile as it is being rendered is compared to a particular data value or set of data values to see when it is the same as the particular data value or set of data values or not. In one embodiment this process is continued for so long as data values being written to the tile match the comparison data value or set of data values.

This enables a simple binary comparison to be made (i.e. is it the same data value (or set of data values) or not?) for the data being written to the sampling positions in the tile buffer.

Correspondingly, in this embodiment, when a different data value is detected, it will be determined that the tile does not have the same data value written to each of the sampling positions in the tile buffer. Thus, this embodiment facilitates identifying when a whole tile has the same data value written to the sampling positions for the tile in the tile buffer, without necessarily also tracking which sampling positions have the data value being written to them.

In one embodiment, the processing circuitry is operable to stop comparing and tracking the data values in the rendered fragment data as that data is being written to the tile buffer for a tile when it is detected that a data value in the rendered fragment data being written to a sampling position in the tile buffer is different from the particular data value or values that are being tracked.

In another embodiment, it is tracked for sampling positions, and, in an embodiment, for each sampling position (and/or for sets of sampling positions), whether a particular data value or values (or set or sets of data values) has been written to the sampling position or not. This may, and in an embodiment does, operate in a similar manner to the way that the writing or not of rendered fragment data to the tile buffer for a sampling position when rendering a tile is tracked, e.g., and in an embodiment, such that a set of information, such as, and in an embodiment, a bitmap, is maintained, in which it is recorded, e.g. and in an embodiment for each sampling position, whether the data value(s) written to that sampling position corresponds to a particular data value (or to one of a set of particular data values) or not. Again, in an embodiment, such a set of information (e.g. bitmap) is then used (assessed) once the tile has been completely rendered, to identify those sampling positions in the tile to which the same particular data value (or set of data values) have been written.

In both these cases, the particular data value or set of data values that is tracked can comprise any suitable and desired data value or set of data values. For example, it could comprise a selected, e.g. predefined, data value or values such as a reference data value, such as a background colour value. Additionally or alternatively, the particular data value or values could, e.g., be a data value, such as, and in an embodiment the first data value, that is written to a sampling position for the tile when the tile is being rendered (or one of the data values that is written to the tile as the tile is being rendered). In this latter case therefore, it will be tracked to see which sampling positions have the same data (e.g. colour) value as another sampling position that has been written to the tile (as a data value or values that has previously been written to the tile buffer for a sampling position in the tile).

Only a single data value could be tracked (in which case it may only need to be indicated for a given sampling position whether that sampling position has that particular data value or not). Alternatively, a set of particular, e.g. and in an embodiment selected, data values could be tracked (e.g. by using plural "tracking" bits per sampling position). For example, a set of three data values could be tracked using a two-bit entry for each sampling position to indicate which one of the three data values has been written to the sampling position or that none of the three data values has been written to the sampling position. Alternatively multiple different bitmaps, e.g. each comprising a single bit at each position in the bitmap (and each corresponding to a sampling position in the tile), may be used when it is desired to track multiple different data values, e.g. colour channels.

Whether a particular data value or values has been written to a sampling position can be tracked in any suitable and desired manner. In an embodiment, as a (and in an embodiment as each) data value is written to the tile buffer, that data value is compared to the particular data value or values being tracked, and the tracking information for the sampling position that the data value is being written to is updated (or not) accordingly. This will then allow the data values that are being written to the sampling positions to be tracked as they are written into the tile buffer.

When comparing data values, in one embodiment the data value(s) that a new data value to be written to the tile buffer is compared with is not read from the tile buffer, but, in an embodiment, is stored in other storage, such as a set of flipflops. Thus, in one embodiment the "comparison" data value(s) are stored locally to tile buffer write operation.

It will be appreciated in this regard that where information tracking the data values that have been written to the tile buffer is used, that information should, and in an embodiment is, only used to identify blocks of sampling positions having the same data value once the tile has been completely rendered (as otherwise it may be the case that data values for sampling positions will be overwritten by later primitives and fragments in the rendering process).

In these arrangements, where blocks of constant data values that are actually written to the tile buffer are identified, then the same, constant data value that is associated with the sampling positions in the block will be a data value that has actually been written to the tile buffer (i.e. a rendered fragment data value).

It will be appreciated that using a bitmap (or otherwise tracking the particular sampling positions that have the same data value(s)), may allow blocks of sampling positions having the same data value (or set of data values) that are smaller than the whole tile to be identified.

Thus in one embodiment the processing circuitry is operable to identify, using the data value tracking information, e.g. bitmap, any blocks comprising a plurality of sampling positions within a tile to which rendered fragment data comprising the same data value (or set of data values) for each of the sampling positions in the block has been written.

A separate "data value" tracking bitmap (e.g.) could be used for this purpose. However, in an embodiment, when a "clear bits" bitmap is defined and used to track the sampling positions within a tile that are not written to ("clear"), the "clear bits" bitmap may be, and in an embodiment is, used to track the data values of the rendered fragment data being written to the array of sampling positions for the tile, e.g., and in an embodiment, when it has been determined that all of the sampling positions in the block (e.g. tile) will have rendered fragment data written to them, i.e. that there will be no sampling positions in the tile that are "clear".

Thus in one embodiment the processing circuitry is operable to determine when a block comprising a plurality of sampling positions in the tile will have rendered fragment data generated for each of the sampling positions in the block, e.g., and in an embodiment, that the block is completely covered with non-transparent primitives, and then, when such a block has been identified, a bitmap previously reserved for tracking the sampling positions within a tile that are not written to (that are "clear") is used to track a data value (or set of data values) in the rendered fragment data being written to sampling positions in the tile buffer for the block (e.g. tile).

As has been outlined above, the block may comprise the whole tile. Alternatively the block may be smaller than the tile, e.g. contain some but not all of the sampling positions in the tile.

Conveniently, the step of determining when a block is completely covered with non-transparent primitives may be performed during rasterising the primitives. Thus, in an embodiment, the processing pipeline comprises rasterising circuitry for rasterising input primitives to generate graphics fragments to be processed, and is operable to identify block(s) comprising a plurality of sampling positions within a tile for which graphics fragments have been generated by the rasterising circuitry for rendering for each of the plurality of sampling positions in the block.

For example, the rasterising circuitry may set a flag when the whole of a tile is covered by non-transparent primitives. This flag may then be read by the processing circuitry such that it can then repurpose the "clear bits" bitmap to use it for tracking a data value (or set of data values) in the rendered fragment data being written to the sampling positions in the tile buffer for the tile (i.e. in the knowledge that fragments will be generated and rendered for each of the sampling positions in the tile (and thus accordingly that rendered fragment data will be written to every sampling position in the tile buffer for the tile)).

Once a block of sampling positions within a tile all having the same data value has been identified, based on the writing of rendered fragment data to the tile buffer for the sampling positions in the block, the write out circuitry is triggered to write a compressed representation of the block of same data value sampling positions to, e.g. external, memory.

It should also be noted that, accordingly, the write out circuitry should not, and in an embodiment does not, also write out (in its normal manner) any data stored in the tile buffer for the block of same data value sampling positions. (In other words, in one embodiment write back (write-out) from the tile buffer is omitted for any identified same data value blocks of sampling positions for which a compressed representation of the same data value blocks of sampling positions is written to memory in the manner of the technology described herein.)

The write out circuitry may be triggered (caused) to write the compressed representation to the memory in any suitable and desired way.

In one embodiment the processing circuitry is operable to signal to the write out circuitry that it has identified a block of sampling positions within a tile having the same associated data value. In one embodiment the write out circuitry is configured receive the signal from the processing circuitry and to write the compressed representation of the block of constant data value sampling positions to the memory when the write out circuitry receives the signal from the processing circuitry. In one embodiment processing circuitry provides the write out circuitry with information necessary to write out the compressed representation of the block of constant data value sampling positions to the memory, e.g. the processing circuitry may provide the write out circuitry with the constant data value associated with the block. In another embodiment the write out circuitry reads information necessary to write out the compressed representation of the block of constant data value sampling positions to the memory, e.g. the constant data value, from the tile buffer, e.g. after receiving a signal from the processing circuitry to indicate that the processing circuitry has identified a block of constant data value sampling positions in a tile.

The write out circuitry may be separate to the processing circuitry or the processing circuitry and the write out circuitry may be combined (e.g. as part of the same processing unit), such that, e.g., when the processing circuitry has identified a block of sampling positions within a tile having the same data value(s) for each of the sampling positions, the write out "part" of the processing circuitry then writes the compressed representation of the block of constant data value sampling positions to the memory.

The compressed representation of the block of constant data value sampling positions written to the, e.g. external, memory may be any suitable and desired compressed representation, e.g. depending on the data value, the size of the block (e.g. whether it is a whole tile or a smaller block of sampling positions), and/or the method used to identify the block.

In an embodiment, the write out circuitry is configured in any event to write compressed representations of the rendered fragment data for tiles from the tile buffer to memory. In this case, in one embodiment the compressed representation of the block of constant data value sampling positions that is written to memory comprises (has the form of) a compressed representation of the block of constant data value sampling positions that is used by the compression scheme in question. One suitable such (e.g. frame buffer) compression technique is described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

The write out circuitry may include and/or have associated with it, a suitable data encoder (compressor) for this purpose.

Thus in one embodiment the processing circuitry indicates, e.g. signals, to the write out circuitry that it has identified a block of constant data value sampling positions, and, e.g., provides the write out circuitry with the necessary information regarding the block of constant data value sampling positions. The write out circuitry is then able to, e.g. generate and write, a compressed representation of the block of constant data value sampling positions to the memory according to a compression scheme used for writing (e.g. other) rendered fragment data for a tile in the tile buffer to memory.

In one embodiment the writing out of the compressed representation of the block of constant data value sampling positions comprises representing the block of sampling positions with a single data value, e.g. the constant data value associated with each of the sampling positions in the block.

The compressed representation may also include an indication of the location and the size of the block, particularly when the block is smaller than a tile, e.g. the compressed representation may include an indication of the sampling positions in the block. When the block is smaller than a tile, in one embodiment the processing circuitry is operable to determine the location and size of the block (e.g. the sampling positions in the block), e.g. from a bitmap used to track sampling positions in the tile (e.g. to which no or constant data value(s) have been written), as described above.

Where the compression scheme (like the compression technique described in the Applicant's U.S. Pat. No. 8,542,939 B2, U.S. Pat. No. 9,014,496 B2, U.S. Pat. No. 8,990,518 B2 and U.S. Pat. No. 9,116,790 B2) represents a block of compressed data using both "header" data, e.g. associated with a block of data to be compressed, and "payload" data (e.g. one or more "body blocks") representing data for the block of compressed data, then in an embodiment, e.g. when a whole tile of constant data value sampling positions has been identified, the writing out of the compressed representation of the block of constant data value sampling positions uses a header only for block (e.g. tile) of sampling positions in question, i.e. comprises encoding information, e.g. the constant data value associated with each of the sampling positions in the block, solely in header data associated with the block or tile. Encoding the compressed representation solely as a header (and thus not writing only associated payload, "body blocks" of data to the memory) helps to reduce the bandwidth of the information written to the memory and thus allows the block to be written out quickly.

Encoding the compressed representation (e.g. solely) in header data associated with the block, e.g. tile, may be performed in any suitable and desired way. In one embodiment the compressed representation is encoded using the frame buffer compression technique as described in the Applicant's U.S. Pat. No. 8,542,939 B2, U.S. Pat. No. 9,014,496 B2, U.S. Pat. No. 8,990,518 B2 and U.S. Pat. No. 9,116,790 B2. This exploits a feature in this frame buffer compression scheme that information for a, e.g. 16×16 or 32×8, block of sampling positions (pixels) may be provided (solely) in header data for a block (e.g. tile) of sampling positions and thus the associated "body blocks" of data do not have to be written to memory (owing to no data having to be carried in them).

When the processing circuitry has identified a plurality of blocks of constant data value sampling positions in a tile, e.g. 4×4 blocks of sampling positions, any further redundancy between these blocks may be, and in an embodiment is, exploited when generating the compressed representation. In particular, when the constant data value is the same for each of a plurality of blocks of sampling positions (and also each of the plurality of blocks may be the same size), the compressed representation may comprise a compressed representation of one of the blocks of constant data value and an indication that the other of the plurality of blocks have the same constant data value (and, e.g., size), e.g. along with associated metadata, such as an indication of the position of each of the constant data value blocks in the tile. Thus the plurality of blocks may be written out as "copy blocks", as is also provided for in the frame buffer compression technique as described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

As will be appreciated, not all tiles may include a constant data value block and thus, for these tiles, the processing circuitry will not identify a constant data value block (and thus similarly the write out circuitry will not be triggered to write out a compressed representation of the block). However the tile will still be rendered and thus rendered fragment data may be written to the tile buffer that will subsequently be written out by the write out circuitry to the memory, e.g. in any suitable and desired way.

Although, for such tiles, the rendered fragment data will not be compressed in the manner described when the processing circuitry identifies a constant data value block, in one embodiment the write out circuitry is arranged to write the rendered fragment data to the memory in a compressed form, e.g. using the frame buffer compression technique as described in the Applicant's U.S. Pat. No. 8,542,939 B2, U.S. Pat. No. 9,014,496 B2, U.S. Pat. No. 8,990,518 B2 and U.S. Pat. No. 9,116,790 B2. However, it will be appreciated that in these embodiments, it is necessary to read all of the rendered fragment data associated with the sampling positions in the tile buffer before it is compressed when writing it to the memory.

Similarly, when one or more blocks of constant data value sampling positions that are smaller than the tile are identified by the processing circuitry and written out in a compressed representation by the write out circuitry to the memory, the tile will contain a region (or regions) that is one or more blocks of constant data value sampling positions and remaining region (or regions) that has not been identified as a block (or blocks) of constant data value sampling positions. In one embodiment of this situation, the write out circuitry is arranged to write out a compressed representation of the one or more blocks of constant data value sampling positions (that have been identified by the processing circuitry) to the memory in the manner of the technology described herein and to write out a compressed representation of the remaining region (or regions) of the tile to the memory according to any suitable and desired compression scheme, e.g. using the frame buffer compression technique as described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

Thus, in one embodiment, the processing circuitry controls (e.g. triggers) the write out circuitry to write out a compressed representation of the rendered tile dependent on the blocks of constant data value sampling positions it has identified and any remaining regions of the tile (which may comprise the whole tile when no blocks of constant data value sampling positions are identified).

As will also be appreciated, in a tile-based graphics processing pipeline, a frame typically comprises a plurality of tiles and so, in one embodiment, the process of the technology described herein is repeated for each of the plurality of tiles in each frame and then for each of a plurality of tiles in a sequence or stream of frames. Thus, in one embodiment, the processing circuitry is operable to identify (e.g. further) redundancies between blocks (e.g. within the same or across different tiles), tiles and/or frames, e.g. blocks and/or tiles that have the same constant data value within a frame, and/or blocks and/or tiles that have the same constant data value across different (e.g. contiguous) frames.

In an embodiment, the graphics processor is also operable to compare rendered tiles to at least one other rendered tile, and to determine whether or not to write the rendered tile to the memory on the basis of the comparison, e.g. and in an embodiment, using the techniques described in the Applicant's patent GB-B-2374114.

The Applicants have found and recognised that this process can be used to reduce significantly the number of rendered tiles that will be written to the memory (e.g. frame buffer) in use, thereby significantly reducing the number of memory (e.g. frame buffer) transactions and hence the power and memory bandwidth consumption related to memory (e.g. frame buffer) operation.

For example, when it is found that a newly rendered tile is the same as a rendered tile that is or will be already present in the memory, it can be (and in an embodiment is) determined to be unnecessary to write the newly generated tile to the memory, thereby eliminating the need for that memory "transaction".

The comparison of the rendered tiles may be carried out as desired and in any suitable manner. In one embodiment the comparison is so as to determine whether the new tile is the same as (or at least sufficiently similar to) the other tile or not. Thus, for example, some or all of the content of the new tile may be compared with some or all of the content of the other tile (and in one embodiment this is done).

In an embodiment, the comparison is performed by comparing information representative of and/or derived from the content of the new tile with information representative of and/or derived from the content of the other tile, e.g., and in an embodiment, to assess the similarity or otherwise of the tiles.

Thus, in an embodiment, a signature indicative or representative of, and/or that is derived from, the content of the tile is generated for each tile that is to be compared, and the comparison process comprises comparing the signatures of the respective tiles.

The signature for a tile may comprise any suitable set of derived information that can be considered to be represen-tative of the content of the tile, such as a checksum, a CRC, or a hash value, etc., derived from (generated for) the tile. Suitable signatures would include standard CRCs, such as CRC32, or other forms of signature such as MD5, SHA-1, etc.

The Applicants have further recognised that where signatures representative of the content of a rendered tile are generated, then the identification of constant data value blocks in the manner of the technology described herein can also be used to make the signature generation process more efficient. For example, in the case that a tile having the same data value associated with all of its sampling positions (e.g. a "clear" tile) is identified, then instead of still performing the signature generation process (e.g. the CRC calculation) for the tile (e.g. using the content of the tile buffer), the same data value associated with the sampling positions of the tile could be, and in an embodiment is, used as the "content representing" signature for the tile.

Thus, when the processing circuitry identifies a tile of constant data value sampling positions, the (e.g. normal) signature generation process is skipped (e.g. the CRC calculation is skipped) and a single data value, e.g. the constant data value, is used as the signature for the basis of the comparison between respective tiles.

Correspondingly, where a tile includes smaller blocks of constant data value sampling positions, then in an embodiment, information relating to those constant data value blocks within the tile is provided to, and/or used in, the signature generation process, as that can again make the signature generation process more efficient. For example, and in an embodiment, an indication of the position (e.g. the sampling positions) of the constant data value block or blocks and their associated data value(s) within the tile could be provided to and used by the signature generation process, e.g., and in an embodiment, to allow the signature generation process to avoid (to omit) having to read the data values for those sampling positions when generating the signature for the tile.

Thus in one embodiment the identification (and in an embodiment also the content) of any blocks of constant data value sampling positions in a tile is used when generating a signature to be used for the basis of the comparison between respective tiles.

Correspondingly, in one embodiment the signature generation process for a tile is configured and/or controlled and/or modified based on the identification (and in an embodiment also the content) of any blocks of constant data value sampling positions in the tile.

The graphics processing pipeline, e.g. in addition to the stages outlined above, may comprise one or more processing stages as is suitable and desired for operation of the graphics processing pipeline. The processing stages may, e.g., be in the form of fixed-function units (hardware), or some or all of the functional units may be programmable (be provided by means of programmable circuitry that can be programmed to perform the desired operation). For example, the graphics processing pipeline may include programmable vertex and/or fragment shaders for performing desired vertex and/or fragment shading operations.

The rendered fragment data in the tile buffer is usually stored as an array of sample values, with different sets of the sample values corresponding to and being associated with respect output pixels of an array of output pixels. There may, e.g., be multiple, e.g. 4, sampling positions per pixel position, for example where rendering outputs are generated in a multi-sampled fashion, but more typically there will be one sampling position per pixel. The tile buffer may store, e.g., a colour buffer containing colour values for the tile in question, and a depth buffer storing depth values for the tile in question.

The graphics processing pipeline may also be provided with fixed-function downsampling circuitry for downsampling the locally stored data before it is written out to the, e.g. external, memory where that is required (as may, e.g., be the case where a frame to be displayed is rendered in a supersampled or multisampled manner for anti-aliasing purposes).

In one embodiment the rasterising circuitry of the graphics processing pipeline will generate graphics fragments to be rendered to generate rendered graphics data for sampling positions of the desired graphics output, such as a frame to be displayed. Each graphics fragment that is generated by the rasterising circuitry has associated with it a set of sampling positions of the graphics output and is to be used to generate rendered graphics data for one or more of the sampling positions of the set of sampling positions associated with the fragment.

The rasterising circuitry may be configured to generate the fragments for rendering in any desired and suitable manner. In one embodiment it will preferably receive, e.g., primitives to be rasterised, test those primitives against sets of sampling positions, and generate fragments representing the primitives accordingly.

The rendering circuitry should process the fragments generated by the rasterising circuitry to generate rendered fragment data for (covered) sampling positions that the fragments represent. These rendering processes may include, for example, fragment shading, blending, texture-mapping, etc. In an embodiment the rendering circuitry is in the form of or includes a programmable fragment shader.

In one embodiment the tile buffer will store an array or arrays of sample values for the tile in question. These sample values are usually, and in an embodiment are, grouped into sets of sample values (such as groups of 2×2 sample values) that are each associated with a respective (e.g. display) pixel in the tile in question. The sample values may, e.g., comprise colour values (a colour buffer), depth values (a depth buffer), etc.

The write out circuitry operates to write the data in the tile buffer (once the data in the tile buffers is complete) out to the, e.g. external (main), memory (e.g. to a frame buffer). This may include, downsampling (averaging), either in a fixed or in a variable fashion, the sample values in the tile buffer to the final output (pixel) value to be written to the, e.g. main, memory (e.g. frame buffer) and/or other output, when desired.

In one embodiment the graphics processing pipeline, e.g. the write out circuitry, comprises compression circuitry configured to generate the compressed representation, e.g. of the blocks of constant data value sampling positions and/or of the rendered tile data in the tile buffer, for writing to the memory.

The memory that the rendered graphics fragment data is written out to from the tile buffer should be and, in an embodiment, is one or more memories external to the graphics processing pipeline, to which write out circuitry can write data, such as a frame buffer. In one embodiment the, e.g. external, memory is provided as or on a separate chip (monolithic integrated circuit) to the graphics processing pipeline (and as or on a separate chip to the chip (integrated circuit) on which the local memory (e.g. including the tile buffer) of the graphics processing pipeline resides). In one embodiment he, e.g. external, memory comprises a main memory (e.g. that is shared with the central processing unit (CPU)), e.g. a frame buffer, of the overall graphics processing system.

The processing circuitry that is operable to identify the blocks of constant data value, etc., may comprise any suitable, e.g. programmable, hardware element such as programmable processing circuitry. This processing circuitry may be provided as a separate circuit element to other, e.g. programmable, stages of the graphics processing pipeline such as a fragment shader. However, it may also be at least partially formed of shared programmable graphics processing circuitry. In an embodiment both the rendering circuitry and the processing circuitry share programmable processing circuitry and, in an embodiment, comprise the same physical circuit blocks (that are then differently programmed to serve as the fragment shader (rendering circuitry) and the processing circuitry).

The graphics processing pipeline may also contain any other suitable and desired processing stages that a graphics processing pipeline may contain such as an early depth (or an early depth and stencil) tester, a late depth (or depth and stencil) tester, a blender, etc.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

Although the technology described herein has been described thus far with reference to a graphics processing pipeline that renders tiles, e.g. for display, the Applicant has appreciated that the methods disclosed may be applicable for use with any suitable and desired image processing system, e.g. in which data is written from a buffer to memory and a block of sampling positions having a constant data value may be identified based on the writing of data to the buffer.

For example, in a video processing system in which a video decoder receives and decodes a stream of encoded video image data (which may then be written to memory before it is displayed), the video decoder (or associated processing circuitry) may be operable to identify a block of sampling positions having a constant data (e.g. colour) value. For example, the (e.g. absence of) transform coefficients in the encoded video image data for a block of sampling positions (and, e.g., with no other sources of entropy (entropy encoded data)), may indicate that the block has a constant data (e.g. colour) value for the sampling positions.

Thus another embodiment of the technology described herein comprises a method of operating a block-based image processing system that comprises:

a buffer configured to store blocks of processed image data prior to the processed image data being written out to memory;

the method comprising:

processing blocks of image data to generate blocks of processed image data for a frame of image data, each block having associated with it an array of sampling positions in the frame of image data;

writing the blocks of processed image data to the buffer;

identifying, based on the processing of the blocks of image data ahead of the processed image data being written to the buffer and/or on the writing of processed image data to the buffer, at least a sub-block of sampling positions of the block comprising a plurality of sampling positions having the same data value associated with each of the plurality of sampling positions in the at least a sub-block of sampling positions of the block; and when at least a sub-block of sampling positions of a block of sampling positions within a frame having the same data value is identified, writing a compressed representation of the at least a sub-block of constant data value sampling positions to the memory.

Another embodiment of the technology described herein comprises a block-based image processing system comprising:

image processing circuitry for processing blocks of image data for a frame of image data, each block having associated with it an array of sampling positions in the frame of image data;

a buffer configured to store blocks of processed image data prior to the processed image data being written out to memory;

write out circuitry configured to write a compressed representation of the processed image data for a block in the buffer to memory; and processing circuitry operable to:
identify, based on the processing of the blocks of image data ahead of the processed image data being written to the buffer and/or on the writing of the processed image data to the buffer, at least a sub-block of sampling positions of the block comprising a plurality of sampling positions having the same data value associated with each of the plurality of sampling positions in the at least a sub-block of sampling positions of the block; and trigger the write out circuitry, when at least a sub-block of sampling positions of a block of sampling positions within a frame having the same data value is identified, to write a compressed representation of the at least a sub-block of constant data value sampling positions to the memory.

As will be appreciated by those skilled in the art, these embodiments of the technology described herein can, and in an embodiment do, include any one or more or all of the optional features of the technology described herein, as appropriate.

The image processing system may comprise any suitable and desired type of image processing system, e.g. a graphics processing system, a video processing system, a compositing engine, a display controller, etc.

When the image processing system comprises a video processing system, in one embodiment the image processing circuitry comprises a video decoder arranged to decode blocks of encoded video image data. Thus in one embodiment the video decoder is operable, based on the decoding of the blocks of encoded video image data ahead of the decoded video image data being written to a, e.g. frame, buffer, to identify at least a sub-block of sampling positions of a block comprising a plurality of sampling positions having the same data value associated with each of the plurality of sampling positions in the at least a sub-block of sampling positions of the block.

The sub-blocks of same data value sampling positions may be identified in any suitable and desired way, based on the decoding of the blocks of encoded video image data, e.g. using transform coefficients for a block that has no other sources of entropy.

In another embodiment the image processing system comprises a, e.g. 2D, compositing engine. In a compositing engine the sub-blocks of sampling positions may be identified in any suitable and desired way, e.g. by identifying that the incoming compressed data includes a sub-block of constant (compressed) data value sampling positions and thus the output will also include a sub-block of constant data value sampling positions.

In an embodiment the graphics processing pipeline also comprises, and/or is in communication with, one or more memories and/or memory devices that store the data described herein, and/or that store software for performing the processes described herein. The graphics processing pipeline may also be in communication with a host microprocessor, and/or with a display for displaying images based on the data generated by the graphics processing pipeline.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein may include, as appropriate, any one or more or all of the optional features described herein.

The methods in accordance with the technology described herein may be implemented at least partially using software e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, rendering circuitry or microprocessor system comprising a data processor causes in conjunction with said data processor said processor, rendering circuitry or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in a further embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments of the technology described herein relate to tile-based graphics processing systems. Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling positions of an array of sampling positions covering the output area to be processed are covered by a primitive, and then determining the appearance each sampling position should have (e.g. in terms of its colour, etc.) to represent the primitive at that sampling position. These processes are commonly referred to as rasterising and rendering, respectively.

The rasterising process determines the sample positions that should be used for a primitive (i.e. the (x, y) positions of the sample positions to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample positions (i.e. "shades" each sample position). This can involve, as is known in the art, applying textures, blending sample position data values, etc.

(In graphics literature, the term "rasterisation" is sometimes used to mean both primitive conversion to sample positions and rendering. However, herein "rasterisation" will be used to refer to converting primitive data to sampling position addresses only.)

These processes are typically carried out by testing sets of one, or of more than one, sampling position, and then generating for each set of sampling positions found to include a sample position that is inside (covered by) the primitive in question (being tested), a discrete graphical entity usually referred to as a "fragment" on which the graphics processing operations (such as rendering) are carried out. Covered sampling positions are thus, in effect, processed as fragments that will be used to render the primitive at the sampling positions in question. The "fragments" are the graphical entities that pass through the rendering process (the rendering pipeline). Each fragment that is generated and processed may, e.g., represent a single sampling position or a set of plural sampling positions, depending upon how the graphics processing system is configured.

(A "fragment" is therefore effectively (has associated with it) a set of primitive data as interpolated to a given output space sample position or positions of a primitive. It may also include per-primitive and other state data that is required to shade the primitive at the sample position (fragment position) in question. Each graphics fragment may be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. owing to transparency and/or blending), the final pixel output may depend upon plural or all fragments at that pixel location.)

(Correspondingly, there may be a one-to-one correspondence between the sampling positions and the pixels of a display, or alternatively there may not be a one-to-one correspondence between sampling positions and display pixels, as downsampling may be carried out on the rendered sample values to generate the output pixel values for displaying the final image. Similarly, where multiple sampling position values, e.g. from different overlapping primitives, at a given location affect each other (e.g. due to transparency and/or blending), the final pixel output will also depend upon plural overlapping sample values at that pixel location.)

Graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

FIG. 1 shows a schematic of a tile-based graphics processing pipeline 1 in accordance with an embodiment of the technology described herein. The pipeline 1 includes a rasteriser 2 for generating fragments to be rendered for sampling positions associated with primitives covering a tile, and a fragment shading stage 4 that receives the rasterised fragments from the, rasteriser 2. The fragment shading stage 4 is configured to render the rasterised fragments, to generate rendered fragment data for the sampling positions associated with the fragments, e.g. to determine the rendered colour and transparency (e.g. RGBa) values for the sampling positions in the tile.

The pipeline 1 also includes a tile buffer 6 that is coupled to the fragment shading stage 4 to allow the rendered fragment data for sampling positions in a tile to be written to the tile buffer 6. The tile buffer 6 is also coupled, via a writeback unit 8, to a frame buffer 10 that is in main memory, i.e. external to the pipeline 1.

The writeback unit 8 is configured to write out a compressed representation of the rendered fragment data written to the tile buffer 6 for a tile to the frame buffer 10. The writeback unit 8 may use a compression scheme such as that described in the Applicant's U.S. Pat. No. 8,542,939 B2, U.S. Pat. No. 9,014,496 B2, U.S. Pat. No. 8,990,518 B2 and U.S. Pat. No. 9,116,790 B2 to represent the rendered fragment data, when writing a compressed representation of the rendered fragment data in the tile buffer to the frame buffer 10. In this case, the compressed representation will be in the form of "header" data associated with a block (e.g. tile) of sampling positions, e.g. that contains data that is common to the block, and "body blocks" data associated with the block, e.g. that contains data that relates to individual, e.g. each of the, sampling positions in the block.

The pipeline 1 shown in FIG. 1, also includes a "solid colour checker" processing stage (processing circuitry) 12 for identifying blocks of constant colour in the tiles that are rendered. The solid colour checker 12 is coupled to the rasteriser 2 and the tile buffer 6 so that it can control the operation of the writeback unit 8 for writing data out to the frame buffer 10, as will be described below.

Figure 2:
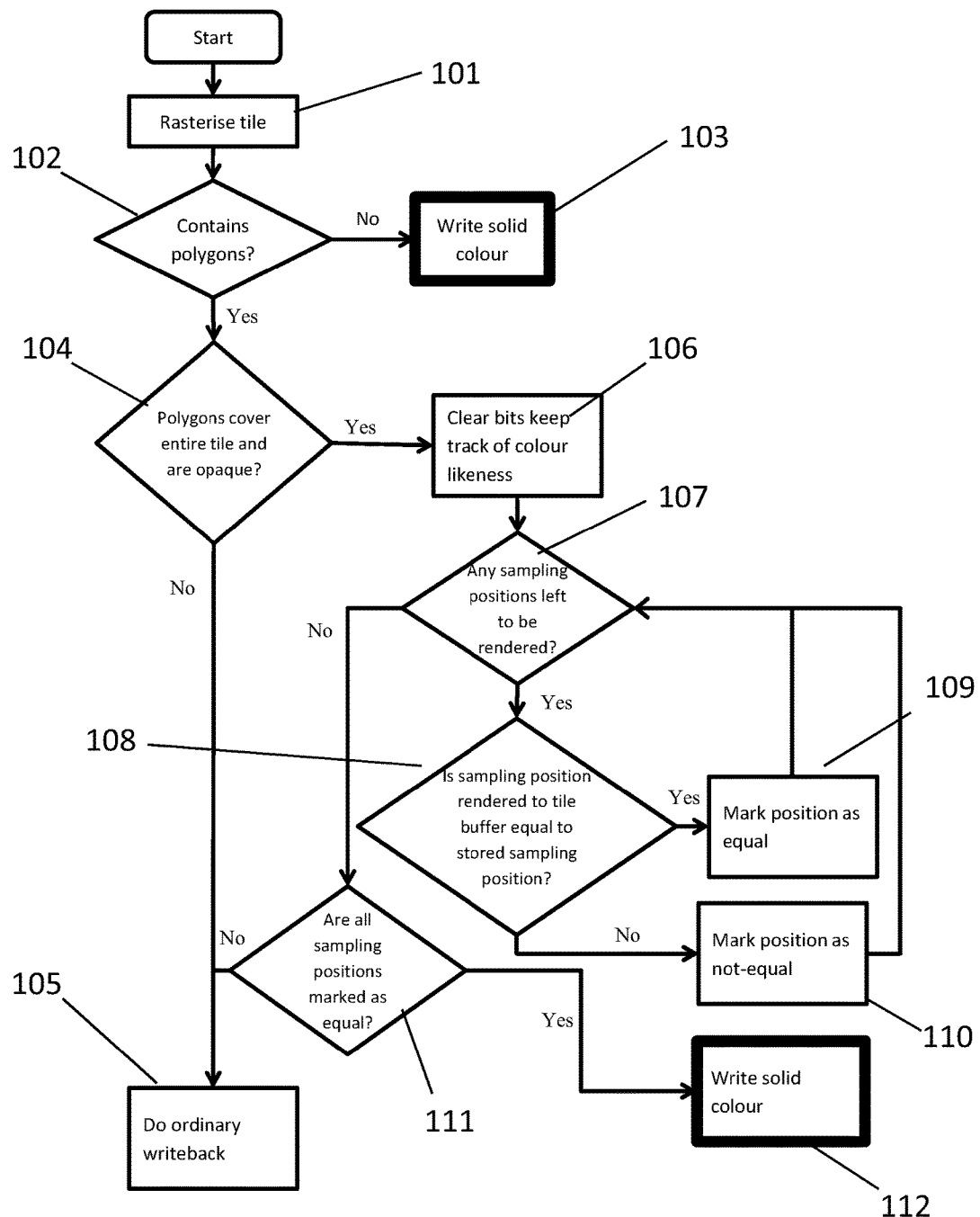
FIG. 2 shows a flowchart of the operation of the tile-based graphics processing pipeline shown in FIG. 1.
Figure 3:
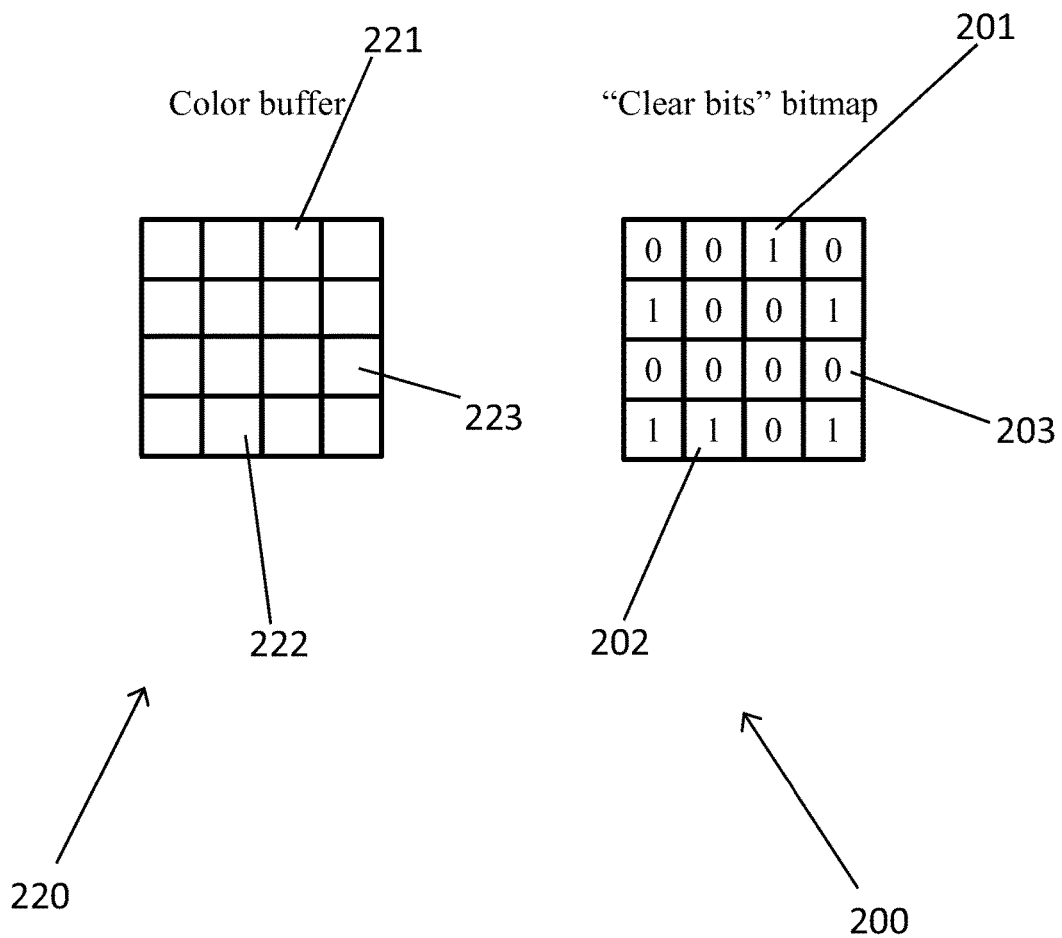
FIG. 3 shows an example of the use of a colour buffer and a "clear bits" bitmap for an example tile for use with the embodiment shown in FIGS. 1 and 2.

Operation of the pipeline 1 shown in FIG. 1 will now be described with reference to FIGS. 1, 2 and 3. FIG. 2 shows a flowchart of the operation of the tile-based graphics processing pipeline shown in FIG. 1, and FIG. 3 shows an example of the use of a colour buffer and a "clear bits" bitmap for an example tile for use with the embodiment shown in FIGS. 1 and 2.

Following the rasterising process (step 101, FIG. 2) by the rasteriser 2, and based on the fragments (if any) that are generated for a tile, the solid colour checker 12 determines when the tile contains any primitives (polygons) to be rendered (step 102, FIG. 2). When there are no primitives to be rendered for the tile (i.e. no primitives are even at least partially covering the tile) then no fragments will have been generated by the rasteriser 2 and thus the tile is completely "clear". This will also mean that there will be no fragments to be rendered by the fragment shading stage 4 and thus no rendered fragment data for any of the sampling positions in the tile will be written to the tile buffer 6.

Upon identifying this absence of primitives and fragments in the tile, the solid colour checker 12 signals to the writeback unit 8 that the tile will not be written to (i.e. it is completely "clear"). The writeback unit 8 then writes an indication that the tile has no rendered fragment data written to it (i.e. it is completely clear) (solely) in the header data associated with the tile that is written to the frame buffer 10 (step 103, FIG. 2), i.e. no data is carried in the "body blocks" data associated with the tile.

Alternatively, the solid colour checker 12 will detect that the tile being rendered does contain primitives to be rendered (step 102, FIG. 2). In this case, fragments will have been generated by the rasteriser 2 for the tile and thus will be rendered by the fragment shading stage 4 to generated rendered fragment data that will be written to the tile buffer 6 for one or more sampling positions in the tile. The solid colour checker then determines, from a flag set by the rasteriser for the tile when the tile is completely covered by opaque primitives (i.e. when opaque primitives cover the entire tile) (step 104, FIG. 2).

When the tile is not completely covered by opaque primitives, i.e. there are one or more sampling positions in the tile that are either clear or translucent (e.g. having an alpha value of less than 1), then the fragments for the primitives in the tile are rendered by the fragment shading stage 4, with the rendered fragment data for the sampling positions associated with these fragments being written to the tile buffer 6. Once all the rendered fragment data for the tile has been written to the tile buffer 6, the writeback unit 8 writes out the rendered fragment data to the frame buffer 10 (step 105, FIG. 2), e.g. using a frame buffer compression technique such as that described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

When the tile is completely covered by opaque primitives, then the fragments for the primitives in the tile are rendered by the fragment shading stage 4, with the rendered fragment data for the sampling positions associated with these fragments being written to the tile buffer 6.

Ordinarily, a "clear bits" bitmap 200 (as shown in FIG. 3) is used to identify the sampling positions in the tile to which no rendered fragment data is written in the tile buffer 6 (i.e. sampling positions that are "clear"). Tracking these "clear" sampling positions in the tile in this way may then allow a tile or block therein to be identified that has sampling positions in the tile to which no rendered fragment data is written in the tile buffer 6, e.g. when such a block or tile is not identified at the rasterising stage. However, once the solid colour checker 12 has determined that the entire tile is covered with opaque polygons (step 104, FIG. 2), it is known that the tracking of "clear" sampling positions in the tile is no longer needed. Thus the bitmap 200 can then be repurposed for use to compare the rendered colour of sampling positions as the rendered fragment data is written to the tile buffer 6.

Thus, as the rendered fragment data for the sampling positions is written to the tile buffer 6, the bitmap 200 is used to keep track of the sampling positions having associated with them rendered fragment data including a colour value that is the same, i.e. to track the sampling positions in the tile that have been rendered the same colour (step 106, FIG. 2).

FIG. 3 shows the use of the "clear bits" bitmap 200 to track the sampling positions in the tile that have been rendered the same colour (having been repurposed from tracking sampling positions to which no rendered fragment data is written in the tile buffer 6). FIG. 3 also shows a colour buffer 220 (as part of the tile buffer 6) showing the colour of the rendered fragment data for the sampling positions in the tile. (For the purposes of clarity the colours are shown in grayscale and the number of sampling positions in the tile is limited to 4×4. In practice any colours may be used and the tile may contain a larger number of sampling positions, e.g. 16×16 or 32×8.)

The solid colour checker 12 compares the colour value in the rendered fragment data as that data is written to sampling positions in the tile buffer 6 with the colour value in the rendered fragment data for the first sampling position written to the tile buffer 6 for the tile, i.e. to identify sampling positions to which rendered fragment data having the same colour value is being written to the tile buffer 6 (step 108, FIG. 2). The solid colour checker 12 then uses the clear bits bitmap 200 to track the sampling positions to which the same colour value has been written to the tile buffer 6.

The clear bits bitmap 200 is an array corresponding to the array of sampling positions in the tile having a bit at each position in the array. When being used to track the colour values being written to the tile, in this embodiment the bit for a sampling position is set to one when the colour value in the rendered fragment data for the sampling position is the same as the colour value for the first sampling position written to the tile buffer 6, or zero when the colour value in the rendered fragment data for the sampling position is different to the colour value for the first sampling position written to the tile buffer 6.

The colour value in the rendered fragment data for the first sampling position 221 is stored in the tile (colour) buffer 220 when the rendered fragment data for this sampling position is written to the tile buffer, and a value of one is written to the corresponding bit 201 in the clear bits bitmap 200.) (In this example, as shown in FIG. 3, it is assumed that the colour value 221 first written to the tile buffer 220 is representative of the colour white.)

Thus the solid colour checker 12 writes a one to a position in the clear bits bitmap 200 when rendered fragment data including a colour value that is the same as the colour value for the first sampling position written to the tile buffer 6 is being written to the tile buffer 6 for a sampling position corresponding to the position in the clear bits bitmap 200 (step 109, FIG. 2). Alternatively, the solid colour checker 12 writes a zero to a position in the clear bits bitmap 200 when rendered fragment data including a colour value that is different from the colour value for the first sampling position written to the tile buffer 6 is being written to the tile buffer 6 for a sampling position corresponding to the position in the clear bits bitmap 200 (step 110, FIG. 2).

Thus, following rendered fragment data being written to the tile buffer 6 for the first sampling position in the tile, the solid colour checker 12 then determines when there are any further sampling positions in the tile left to be rendered, i.e. when there is any further rendered fragment data for the tile to be written to the tile buffer 6 (step 107, FIG. 2). When there are more sampling positions in the tile left to be rendered then when rendered fragment data for a sampling position is written to the tile buffer 6, the colour value in the rendered fragment data for the sampling position is compared with the colour value in the rendered fragment data for the first sampling position 221 (step 108, FIG. 2). When the colour value in the rendered fragment data for the sampling position is equal to the colour value in the rendered fragment data for the first sampling position 221, a value of one is written to the bit in the clear bits bitmap 200 for the position in the array corresponding to the sampling position (step 109, FIG. 2). When the colour value in the rendered fragment data for the sampling position is different to the colour value in the rendered fragment data for the first sampling position 221, a value of zero is written to the bit in the clear bits bitmap 200 for the position in the array corresponding to the sampling position (step 110, FIG. 2).

As can be seen from FIG. 3, in this example five of the sampling positions 222 in the tile have a colour value representative of the colour white in the tile (colour) buffer 220 and thus the five corresponding positions 202 in the clear bits bitmap are marked with the value one. The remaining ten sampling positions 223 in the tile have a colour value representative of a colour that is not white in the colour buffer 220 and thus the ten corresponding positions 203 in the clear bits bitmap are marked with the value zero.

When all of the rendered fragment data for the tile has been written to the tile buffer 6, the solid colour checker 12 then determines when all of the sampling positions have a colour value associated with them in the rendered fragment data that is the same, i.e. when all of values in the array of the bitmap are equal to one (step 111, FIG. 2). (As shown in FIG. 3, the bitmap 200 indicates that the sampling positions do not have associated with them the same rendered colour, for the example tile for which the colour values are shown in the colour buffer 220.)

When the solid colour checker 12 identifies a tile that has the same colour value associated with each of the sampling positions in the tile, the solid colour checker 12 signals to the writeback unit 8 that the tile is a constant colour. The writeback unit 8 then writes an indication that the tile is a constant colour solely in the header data associated with the tile that is written to the frame buffer 10 (step 112, FIG. 2).

When the solid colour checker 12 does not determine that the tile has the same colour value associated with each of its sampling positions (as is the case for the tile associated with the rendered fragment data shown in the colour buffer 220 in FIG. 3), the writeback unit 8 writes out the rendered fragment data to the frame buffer 10 (step 105, FIG. 2), e.g. using a frame buffer compression technique such as that described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

The data ultimately written to the frame buffer 10 may then be output, e.g. displayed. The process described above for one tile is repeated for each of the tiles in a frame, and then repeated for the subsequent frames being rendered by the graphics processing pipeline 1.

It can be seen from the above that the method and tile-based graphics processing pipeline of the technology described herein identifies blocks having the same, constant data value associated with all of the sampling positions in the block, based on the writing of rendered fragment data to the tile buffer for sampling positions in a tile. This makes is possible to write out a compressed version of the block, e.g. only a single data value for the block as a whole, to memory without having to first read all the rendered fragment data that is stored in the tile buffer for the entire tile.

Although the embodiment described above with reference to FIGS. 1-3 is described with reference to a tile-based graphics processing pipeline, it will be appreciated that the technology described herein is also applicable to other forms of image processing systems, e.g. video processing systems, in which blocks of constant data value data positions may be identified to control the compression of those blocks of data positions when writing them to memory.

Furthermore, although the embodiment described above with reference to FIGS. 1-3 identifies blocks of constant colour, it will be appreciated that blocks of any suitable and desired constant data value may be identified, e.g. transparency or only a single colour channel. The blocks identified may be smaller than a full tile and thus the step of determining whether primitives cover the whole tile could be modified to determine also or instead when primitives cover a block of sampling positions smaller than a full tile.

The steps of comparing the colour of sampling positions written to the tile buffer to see when the full tile has the same constant colour value could be stopped once it has been determined that one sampling position does not have the same colour value associated with it as the colour value associated with the sampling position first written to the tile buffer. Alternatively the comparison could be continued until all the rendered fragment data has been written to the tile buffer and then the bitmap could be used to identify blocks smaller than the full tile which have a constant colour value.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilize the technology, in various embodiments and with various modifications as are suited to the particular use contemplated. It is intended that the scope be defined by the claims appended hereto.

What is claimed is:

1. A method of operating a tile-based graphics processing pipeline that comprises:
    a tile buffer configured to store rendered fragment data for sampling positions locally to the graphics processing pipeline prior to the rendered fragment data being written out to memory;
    the method comprising:
        rasterising input primitives to generate graphics fragments to be processed for a tile;
        identifying a block comprising a plurality of sampling positions in the tile that will have rendered fragment data generated for each of the sampling positions in the block;
        when such a block has been identified, using a bitmap previously reserved for tracking the sampling positions within a tile that are not written to, to track a data value or set of data values in the rendered fragment data associated with the sampling positions of the block;
        rendering graphics fragments to generate rendered fragment data, each graphics fragment having associated with it a set of one or more sampling positions to be rendered in a tile;
        writing the rendered fragment data for sampling positions in the tile to the tile buffer;
        tracking the writing of a particular data value or set of data values in the rendered fragment data to the sampling positions in the tile buffer for a tile as that data is written to the tile buffer by writing an indication in the bitmap comprising an array of bits corresponding to the array of sampling positions in a tile when rendered fragment data is generated and written to the tile buffer for a sampling position in the tile and the data value or set of data values in the rendered fragment data associated with the sampling position is the same as the particular value or set of values;
        identifying, based on the tracking of the particular data value or set of data values in the writing of rendered fragment data to the tile buffer for a tile using the bitmap, a block comprising a plurality of sampling positions within the tile to which rendered fragment data having the same data value or set of data values associated with each of the plurality of sampling positions in the block is written; and
        when a block of sampling positions within a tile each having the same data value or set of data values is identified, writing a compressed representation of the block of same data value or set of data values sampling positions to the memory.

2. The method of claim 1, further comprising identifying a block of same data value sampling positions by determining that no rendered fragment data has been written to the tile buffer for any of the plurality of sampling positions in the block.

3. The method of claim 1, further comprising rasterising input primitives to generate graphics fragments to be processed for a tile, and identifying a block comprising a plurality of sampling positions within a tile for which no fragments have been generated by the rasterising process.

4. The method of claim 1, comprising:
    writing an indication in a bitmap comprising an array of bits corresponding to the array of sampling positions in a tile when rendered fragment data is generated and written to the tile buffer for a sampling position in the tile, and
    identifying, using the bitmap, a block comprising a plurality of sampling positions within a tile for which no rendered fragment data has been written to the tile buffer.

5. The method of claim 1, wherein the particular data value or set of data values being tracked comprises a reference value or set of reference values, or a value or set of data values that has previously been written to the tile buffer for a sampling position in the tile.

6. The method of claim 1, wherein:
    the step of writing a compressed representation of a block of same data value sampling positions to the memory comprises using a header data block only of a compression scheme that encodes information using both header data blocks and further data blocks to write the compressed representation of the block of same data value sampling positions to the memory.

7. A tile-based graphics processing pipeline comprising:
    rasterising circuitry for rasterising input primitives to generate graphics fragments to be processed for a tile;
    rendering circuitry for rendering graphics fragments to generate rendered fragment data, each graphics fragment having associated with it a set of one or more sampling positions to be rendered;
    a tile buffer configured to store rendered fragment data for sampling positions locally to the graphics processing pipeline prior to the rendered fragment data being written out to memory;
    write out circuitry configured to write a compressed representation of the rendered fragment data for a tile in the tile buffer to memory; and
    processing circuitry;
    wherein the rasterising circuitry or the processing circuitry is operable to:
        identify a block comprising a plurality of sampling positions in a tile that will have rendered fragment data generated for each of the sampling positions in the block; and the processing circuitry is operable to:
        use a bitmap previously reserved for tracking the sampling positions within a tile that are not written to, when a block comprising a plurality of sampling positions in a tile that will have rendered fragment data generated for each of the sampling positions in the block has been identified, to track a data value or set of data values in the rendered fragment data associated with the sampling positions of the block;

track the writing of a particular data value or set of data values in the rendered fragment data to the sampling positions in the tile buffer for a tile as that data is written to the tile buffer by writing an indication in the bitmap comprising an array of bits corresponding to the array of sampling positions in a tile when rendered fragment data is generated and written to the tile buffer for a sampling position in the tile and the data value or set of data values in the rendered fragment data associated with the sampling position is the same as the particular value or set of values;

identify, based on the tracking of the particular data value or set of data values in the writing of rendered fragment data to the tile buffer for a tile using the bitmap, a block comprising a plurality of sampling positions within the tile to which rendered fragment data having the same data value or set of data values associated with each of the plurality of sampling positions in the block is written; and trigger the write out circuitry, when a block of sampling positions within a tile each having the same data value or set of data values is identified, to write a compressed representation of the block of same data value or set of data values sampling positions to the memory.

8. The tile-based graphics processing pipeline of claim 7, wherein the processing circuitry is operable to identify a block of same data value sampling positions by determining that no rendered fragment data has been written to the tile buffer for any of the plurality of sampling positions in the block.

9. The tile-based graphics processing pipeline of claim 7, wherein the rasterising circuitry or the processing circuitry is operable to identify a block comprising a plurality of sampling positions within a tile for which no fragments have been generated by the rasterising circuitry.

10. The tile-based graphics processing pipeline of claim 7, wherein the processing circuitry is operable to:

write an indication in a bitmap comprising an array of bits corresponding to the array of sampling positions in a tile when rendered fragment data is generated and written to the tile buffer for a sampling position in the tile, and identify, using the bitmap, a block comprising a plurality of sampling positions within a tile for which no rendered fragment data has been written to the tile buffer.

11. The tile-based graphics processing pipeline of claim 7, wherein the particular data value or set of data values being tracked comprises a reference value or set of reference values, or a value or set of data values that has previously been written to the tile buffer for a sampling position in the tile.

12. The tile-based graphics processing pipeline of claim 7, wherein the write out circuitry is configured to write a compressed representation of a block of same data value sampling positions to the memory using only a header data block of a compression scheme that encodes information using both header data blocks and further data blocks.

13. A non-transient computer readable storage medium storing computer software code which when executing on a graphics processing system performs a method of operating a tile-based graphics processing pipeline that comprises:

a tile buffer configured to store rendered fragment data for sampling positions locally to the graphics processing pipeline prior to the rendered fragment data being written out to memory;

the method comprising:

rasterising input primitives to generate graphics fragments to be processed for a tile;

identifying a block comprising a plurality of sampling positions in the tile that will have rendered fragment data generated for each of the sampling positions in the block;

when such a block has been identified, using a bitmap previously reserved for tracking the sampling positions within a tile that are not written to, to track a data value or set of data values in the rendered fragment data associated with the sampling positions of the block;

rendering graphics fragments to generate rendered fragment data, each graphics fragment having associated with it a set of one or more sampling positions to be rendered in a tile;

writing the rendered fragment data for sampling positions in the tile to the tile buffer;

tracking the writing of a particular data value or set of data values in the rendered fragment data to the sampling positions in the tile buffer for a tile as that data is written to the tile buffer by writing an indication in the bitmap comprising an array of bits corresponding to the array of sampling positions in a tile when rendered fragment data is generated and written to the tile buffer for a sampling position in the tile and the data value or set of data values in the rendered fragment data associated with the sampling position is the same as the particular value or set of values;

identifying, based on the tracking of the particular data value or set of data values in the writing of rendered fragment data to the tile buffer for a tile using the bitmap, a block comprising a plurality of sampling positions within the tile to which rendered fragment data having the same data value or set of data values associated with each of the plurality of sampling positions in the block is written; and when a block of sampling positions within a tile each having the same data value or set of data values is identified, writing a compressed representation of the block of same data value or set of data values sampling positions to the memory.

* * * * *